United States Patent
Savolainen

(10) Patent No.: US 11,089,533 B2
(45) Date of Patent: Aug. 10, 2021

(54) METHOD AND APPARATUS FOR CONNECTING TO A NODE OF A MESH NETWORK

(71) Applicant: Nokia Technologies Oy, Espoo (FI)

(72) Inventor: Teemu Ilmari Savolainen, Nokia (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 15/305,274

(22) PCT Filed: May 1, 2014

(86) PCT No.: PCT/IB2014/061139
§ 371 (c)(1),
(2) Date: Oct. 19, 2016

(87) PCT Pub. No.: WO2015/166307
PCT Pub. Date: Nov. 5, 2015

(65) Prior Publication Data
US 2017/0048783 A1 Feb. 16, 2017

(51) Int. Cl.
*H04W 40/24* (2009.01)
*H04W 76/10* (2018.01)
(Continued)

(52) U.S. Cl.
CPC .......... *H04W 40/24* (2013.01); *H04L 45/026* (2013.01); *H04L 45/121* (2013.01); *H04L 45/26* (2013.01);
(Continued)

(58) Field of Classification Search
None
See application file for complete search history.

(56) References Cited

U.S. PATENT DOCUMENTS

2008/0031203 A1 2/2008 Bill
2008/0112363 A1 5/2008 Rahman et al.
(Continued)

FOREIGN PATENT DOCUMENTS

CN 1764107 A 4/2006
CN 101438538 A 5/2009
(Continued)

OTHER PUBLICATIONS

International Search Report and Written Opinion received for corresponding Patent Cooperation Treaty Application No. PCT/IB2014/061139, dated Dec. 11, 2014, 9 pages.
(Continued)

*Primary Examiner* — Peter Chen
*Assistant Examiner* — Jeff Banthrongsack
(74) *Attorney, Agent, or Firm* — Alston & Bird LLP

(57) ABSTRACT

A method, apparatus and computer program product are provided for connecting to a node of a mesh network. A method is provided for causing transmission of an advertisement message comprising connectivity characteristics for a joining node and receiving a connection opening indication from a first node of a plurality of nodes in a mesh network. The connection opening indication is based on first node of the plurality of nodes satisfying the connection characteristic and the connection opening indication is also based on the respective connection characteristics or performance metrics of the plurality of nodes. The method also includes causing an establishment of a connection between the joining node and the first node of the plurality of nodes.

17 Claims, 7 Drawing Sheets

(51) Int. Cl.
  H04W 84/18 (2009.01)
  H04W 40/02 (2009.01)
  H04L 12/721 (2013.01)
  H04L 12/751 (2013.01)
  H04L 12/727 (2013.01)
  H04W 76/14 (2018.01)
  H04W 4/80 (2018.01)

(52) U.S. Cl.
  CPC ............ *H04W 4/80* (2018.02); *H04W 40/02* (2013.01); *H04W 40/246* (2013.01); *H04W 76/10* (2018.02); *H04W 76/14* (2018.02); *H04W 84/18* (2013.01); *Y02D 30/70* (2020.08)

(56) References Cited

U.S. PATENT DOCUMENTS

| | | |
|---|---|---|
| 2010/0278118 A1 | 11/2010 | Gossain et al. |
| 2012/0052802 A1* | 3/2012 | Kasslin ................ H04W 48/12 455/41.2 |
| 2012/0196534 A1* | 8/2012 | Kasslin ................ H04W 4/06 455/41.2 |
| 2013/0322281 A1 | 12/2013 | Ludlow et al. |
| 2014/0036683 A1 | 2/2014 | Krishnamurthy et al. |
| 2014/0357194 A1* | 12/2014 | Jin ..................... H04W 8/005 455/41.2 |

FOREIGN PATENT DOCUMENTS

| | | | |
|---|---|---|---|
| CN | 102160451 A | 8/2011 | |
| JP | 2004-104774 A | 4/2004 | |
| JP | 2009-218811 A | 9/2009 | |
| JP | 2011-142456 A | 7/2011 | |
| WO | 2010023601 A2 | 3/2010 | |
| WO | 2011/072437 A1 | 6/2011 | |
| WO | 2013/034924 A1 | 3/2013 | |
| WO | WO 2013/132134 | 9/2013 | |
| WO | WO-2013132134 A1 * | 9/2013 | .............. H04W 4/08 |
| WO | 2013/175741 A1 | 11/2013 | |
| WO | 2013/177450 A2 | 11/2013 | |
| WO | 2013/177792 A1 | 12/2013 | |

OTHER PUBLICATIONS

"Bluetooth Specification V4.1", Specification of the Bluetooth system, Dec. 3, 2013, 2684 pages.

"Bluetooth Specification V4.0", Specification of the Bluetooth system, Jun. 30, 2010, 2302 pages.

Vasseur et al., "Routing Metrics Used for Path Calculation in Low-Power and Lossy Networks", RFC 6551, Internet Engineering Task Force (IETF), Mar. 2012, pp. 1-30.

Winter et al., "RPL: IPv6 Routing Protocol for Low-Power and Lossy Networks", RFC 6550, Internet Engineering Task Force (IETF), Mar. 2012, pp. 1-157.

"Directed Acyclic Graph", Wikipedia, Retrieved on Dec. 4, 2017, Webpage available at : https://en.wikipedia.org/wiki/Directed_acyclic_graph.

Tripathi et al., "A Performance Evaluation Study of RPL: Routing Protocol for Low Power and Lossy Networks", 44th Annual Conference on Information Sciences and Systems (CISS), Mar. 17-19, 2010, 6 pages.

Gaddour et al., "Simulation and Performance Evaluation of DAG Construction with RPL", Third International Conference on Communications and Networking, Mar. 29-Apr. 1, 2012, 8 pages.

Gomez et al., "Overview and Evaluation of Bluetooth Low Energy: An Emerging Low-Power Wireless Technology", Sensors, vol. 12, No. 9, 2012, pp. 11734-11753.

Nieminen et al., "Transmission of IPv6 Packets over Bluetooth Low Energy draft-ietf-6lo-btle-00", 6Lo Working Group, Internet-Draft, Nov. 7, 2013, pp. 1-14.

Haatanen, "Self-organizing Routing Protocol for Bluetooth Low Energy Sensor Networks", Thesis, 2012, pp. 1-37.

Pan et al., "The Orphan Problem in ZigBee Wireless Networks", IEEE Transactions on Mobile Computing, 2007, pp. 1-12.

Ergen, "ZigBee/IEEE 802.15.4 Summary", Sep. 10, 2004, 37 pages.

Extended European Search Report received for corresponding European Patent Application No. 14890482.4, dated Nov. 22, 2017, 7 pages.

Office action received for corresponding Japanese Patent Application No. 2016-565205, dated Jan. 9, 2018, 2 pages of office action and 3 pages of office action translation available.

Office Action for European Application No. 14890482.4 dated Mar. 15, 2019, 9 pages.

Office Action for Chinese Application No. 20148007540.X dated Mar. 28, 2019.

Office Action for European Application No. 14890482.4 dated Sep. 9, 2019, 9 pages.

Office Action for European Application No. 14 890 482.4 dated Mar. 19, 2020, 11 pages.

Office Action for European Application No. 14890482.4 dated Oct. 19, 2020, 5 pages.

Office Action for European Application No. 14890482.4 dated Aug. 14, 2020.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Routing-MC-Type|Res Flags|P|C|0|R| A   |   Prec Length (bytes)|
+-+-+-+-+-+-+-+-+-+-+-+-+-+-+-+-+-+-+-+-+-+-+-+-+-+-+-+-+-+-+-+-+
|                                                               |
//                        (object body)                        //
|                                                               |
+-+-+-+-+-+-+-+-+-+-+-+-+-+-+-+-+-+-+-+-+-+-+-+-+-+-+-+-+-+-+-+-+
```

Figure 2

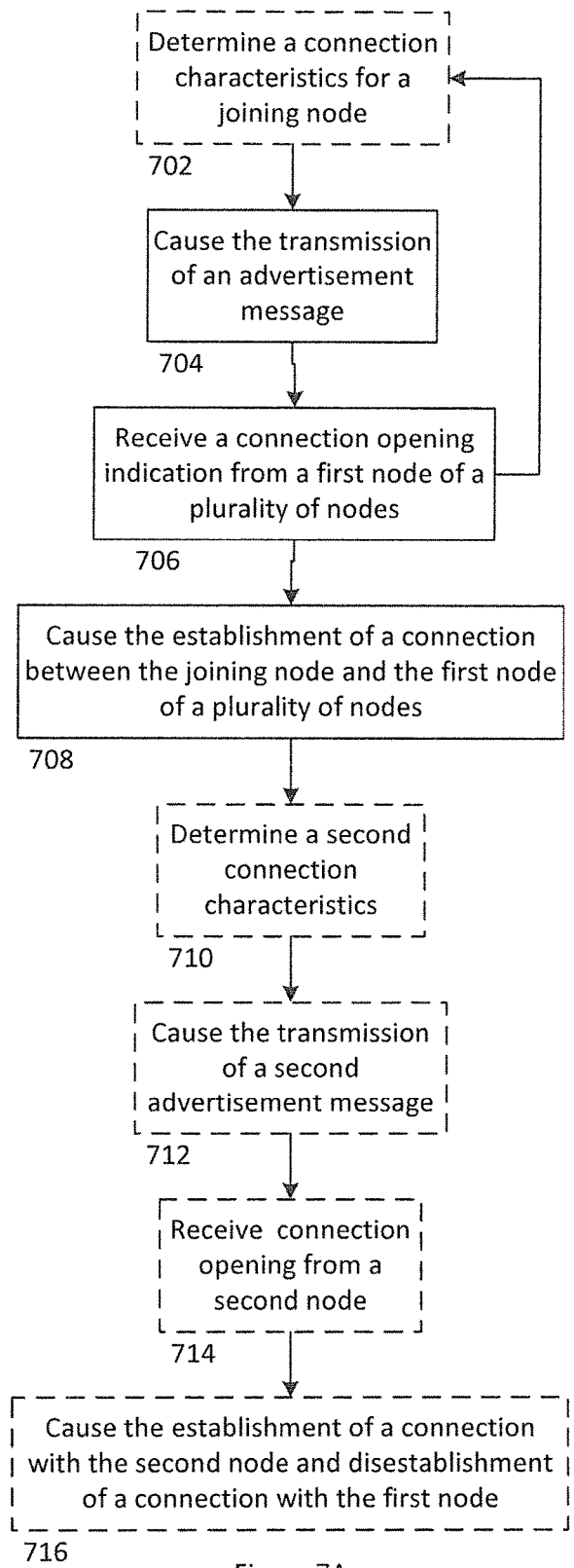
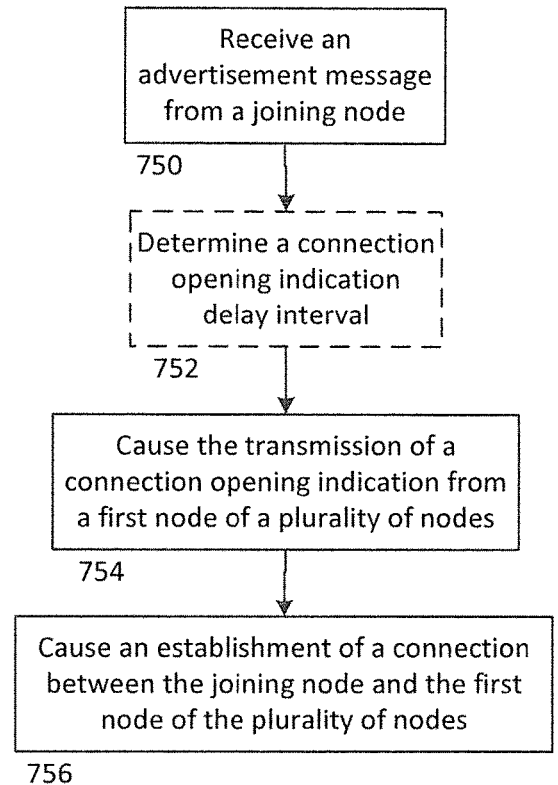
Figure 7A
Figure 7B

METHOD AND APPARATUS FOR CONNECTING TO A NODE OF A MESH NETWORK

RELATED APPLICATION

This application was originally filed as Patent Cooperation Treaty Application No. PCT/IB2014/061139 filed May 1, 2014.

TECHNOLOGICAL FIELD

An example embodiment of the present invention relates to mesh network communications and, more particularly, for connecting to a node of a mesh network.

BACKGROUND

Wireless technology, such as Bluetooth, could be used to establish a mesh network or scatter network, however existing standards do not describe how to execute the network connections. Connection oriented channels (COC) may be used to negotiate logical link control and adaptation protocol (L2CAP) connections needed in IPv6 transport. The COC may use credit based flow control, where each node tells its neighbor how many packets it is willing to receive on a connection. In some instances neighboring nodes may have differing credit amounts. Each transaction decreases the credit amounts until the sending node reaches zero and no further information packets may be sent. The receiving node may be able to increase credit amounts at any time or in response to receiving data packets. The use of a credit based COC scheme in a mesh network may cause different legs of the network to have different numbers of credits available.

In some wireless networks, such as a Bluetooth low energy mesh network, a connection event interval (connInterval) parameter defines how often communication events occur over the established communications link. The connInterval may have values ranging from 7.5 ms to 4000 ms. The connInterval is a key factor in the overall latency of communications in a Bluetooth low energy mesh network.

An established wireless communication link, such as Bluetooth, may have costs in the form of energy and resources, such as random access memory (RAM) and central processing unit (CPU) allocation. An increase in the number of communication links a device has active at the same time will have a corresponding increase in energy and resource costs.

Traditional routing protocols, such as IPv6 Routing Protocol for Low-Power and Lossy Networks (RPL), are configured to make forwarding decisions by minimizing energy consumption, minimizing latency, or satisfying constraints. In some instances RPL may utilize dynamic metrics using multi-threshold schemes, or where the reporting frequency may differ between metrics, allowing the network, for example, to avoid battery powered nodes and favor nodes which are connected to a power outlet or hard wired. However, RPL work on top of the Internet Protocol (IP). Therefore, information about nodes in a network may only be available after an IP connection is established.

A node attempting to join a mesh network will not have information regarding the resources available for each node in the network. Similarly the network will not have information regarding the connection characteristics or resources needed by the joining node. Since neither the mesh network nor the joining node has information to make an informed connection, the joining node and mesh network may cause a connection which does not have sufficient resources. Additionally, the connection may not conserve the resources of the mesh network.

BRIEF SUMMARY

A method and apparatus are provided in accordance with an example embodiment for connecting to a node of a mesh network, such as Bluetooth low energy-based mesh network. In an example embodiment, a method is provided including causing the transmission of an advertisement message comprising connectivity characteristics for a joining node and receiving a connection opening indication from a first node of a plurality of nodes in a mesh network. The connection opening indication is based on the first node of the plurality of nodes satisfying the connection characteristics and the connection opening indication is further based on the respective connection characteristics or performance metrics of the plurality of nodes. The method also includes causing the establishment of a connection between the joining node and the first node of the plurality of nodes. In an example embodiment, the method also includes determining connection characteristics data for the joining node.

In some example embodiments, the method also includes determining a second connection characteristics for the joining node in response to establishing a connection to the first node, causing a transmission of a second advertisement message comprising the second connection characteristics data, and receiving a connection opening indication from a second node of the plurality of nodes. The connection opening is based on the second node of the plurality of nodes satisfying the connection characteristics. The method also includes causing the establishment of a connection between the joining node and the second node and disestablishment of the connection between the joining node and the first node. In an example embodiment of the method, the mesh network is a Bluetooth low energy network. In some embodiments of the method, the connection characteristics comprise a connection interval or a connection oriented channel credit value.

In an example embodiment of the method, the connection opening indication is based on a delay interval based on the connection characteristics or performance metrics of the node of the plurality of nodes sending the connection opening indication. In some example embodiments of the method, the delay interval is a predetermined period of time. In example embodiments of the method, the delay interval is a predetermined number of advertisement messages received.

In another embodiment a method is provided including receiving an advertisement message including connection characteristics for a joining node and causing a transmission of a connection opening indication from a first node of a plurality of nodes in a mesh network. The connection opening indication is based on the first node satisfying the connection characteristics, and the connection opening indication is further based on the respective connection characteristics or performance metrics of the plurality of nodes. The method also includes causing an establishment of a connection between the joining node and the first node of the plurality of nodes. In an example embodiment, the method also includes determining a connection opening indication delay time interval based on the first node of the plurality of nodes connection characteristics or performance metrics.

In an example embodiment of the method, the mesh network is a Bluetooth low energy network. In some example embodiments of the method, the connection characteristics comprise a connection interval or a connection oriented channel credit value.

In a further example embodiment, a method is provided that includes causing the transmission of an advertisement message from a mesh network. The advertisement message includes node connection data or performance metrics for a plurality of nodes. The method also includes receiving a connection opening indication from a joining node at a first node of the plurality of nodes based on the connection data or power data and causing the establishment of a connection between the joining node and first node of the plurality of nodes. In an example embodiment, the method also includes aggregating connection data or performance metrics for the plurality of nodes.

In an example embodiment of the method, the mesh network is a Bluetooth low energy network. In some example embodiments of the method, the connection opening indication is based on a node of the plurality of nodes with the connection characteristics or performance metrics that meets a predetermined connection data threshold. The connection data comprises a connection interval or a connection oriented channel credit value, in some embodiments of the method.

In another embodiment a method is provided including receiving an advertisement message from a mesh network at a joining node. The mesh network includes a plurality of nodes, and the advertisement message comprises connection data or performance metrics associated with respective nodes of the plurality of nodes. The method also includes determining a first node from the plurality of nodes to establish a connection based on the connection data or performance metrics, causing a transmission of a connection opening indication to the first node of the plurality of nodes, and causing an establishment of a connection between the joining node and the first node of the plurality of nodes.

In an example embodiment of the method, the mesh network is a Bluetooth low energy network. In some embodiments of the method, the connection data comprises a connection interval or a connection oriented channel credit value. In still further example embodiments of the method, the determining a node from the plurality of nodes to establish a connection also includes determining the node of the plurality of nodes with the highest connection characteristics or performance metrics that meets a predetermined connection data threshold.

In yet another example embodiment an apparatus is provided including at least one processor and at least one memory including computer program code, with the at least one memory and computer program code configured to, with the processor, cause the apparatus to at least cause the transmission of an advertisement message comprising connectivity characteristics for a joining node and receive a connection opening indication from a first node of a plurality of nodes in a mesh network. The connection opening is based on the first node of the plurality of nodes satisfying the connection characteristics and the connection opening is further based on the respective connection characteristics or performance metrics of the plurality of nodes. The at least one memory and computer program code are also configured to cause the establishment of a connection between the joining node and the first node of the plurality of nodes.

In an example embodiment of the apparatus the at least one memory and the computer program code are also configured to determine connection characteristics data for the joining node. In some examples of this apparatus, the at least one memory and the computer program code are also configured to determine second connection characteristics for the joining node in response to establishing a connection to the first node, cause a transmission of a second advertisement message comprising the second connection characteristics data, receive a connection opening indication from a second node of the plurality of nodes with the connection opening indication is based on the second node of the plurality of nodes satisfying the connection characteristics, and cause the establishment of a connection between the joining node and the second node and disestablishment of the connection between the joining node and the first node.

In an example embodiment of the apparatus, the mesh network is a Bluetooth low energy network. In some example embodiments of the apparatus, the connection characteristics comprise a connection interval or a connection oriented channel credit value. In further example embodiments of the apparatus, the connection opening indication is based on a delay interval based on the connection characteristics or performance metrics of the node of the plurality of nodes sending the connection opening indication.

In an example embodiment of the apparatus, the delay interval is a predetermined period of time. In some example embodiments of the apparatus, the delay interval is a predetermined number of advertisement messages received.

In another example embodiment an apparatus is provided including at least one processor and at least one memory including computer program code, with the at least one memory and computer program code configured to, with the processor, cause the apparatus to at least receive an advertisement message comprising connection characteristics for a joining node; and cause a transmission of a connection opening indication from a first node of a plurality of nodes in a mesh network. The connection opening indication is based on the first node satisfying the connection characteristics and the connection opening indication is further based on the respective connection characteristics or performance metrics of the plurality of nodes. The at least one memory and computer program code are also configured to cause an establishment of a connection between the joining node and the first node of the plurality of nodes. In an example embodiment of the apparatus the at least one memory and computer program code are also configured to determine a connection opening indication delay time interval based on the connection characteristics or performance metrics of the first node of the plurality of nodes.

In an example embodiment of the apparatus, the mesh network is a Bluetooth low energy network. In some embodiments of the apparatus, the connection characteristics comprise a connection interval or a connection oriented channels credit value.

In an example embodiment an apparatus is provided including at least one processor and at least one memory including computer program code, with the at least one memory and computer program code configured to, with the processor, cause the apparatus to at least cause the transmission of an advertisement message from a mesh network. The advertisement message includes node connection data or performance metrics for a plurality of nodes. The at least one memory and computer program code are also configured to cause the apparatus to receive a connection opening indication from a joining node at a first node of the plurality of nodes based on the connection data or performance metrics and cause the establishment of a connection between the joining node and first node of the plurality of nodes. In an example embodiment of the apparatus the at least one memory and the computer program code are also configured to aggregate connection or performance metrics for the plurality of nodes.

In an example embodiment of the apparatus, the mesh a network is Bluetooth low energy network. In some embodiments of the apparatus the connection opening indication is based on the determining a node of the plurality of nodes with the highest connection characteristics or performance metrics that also meets a predetermined connection data threshold. In a further embodiment of the apparatus the connection data comprises a connection interval or a connection oriented channel credit value.

In still a further example embodiment, an apparatus is provided including at least one processor and at least one memory including computer program code, with the at least one memory and computer program code configured to, with the processor, cause the apparatus to at least receive an advertisement message from a mesh network at a joining node. The mesh network comprises a plurality of nodes. The advertisement message includes connection data or performance metrics associated with the respective nodes of the plurality of nodes. The at least one memory and computer program code are also configured to determine a first node from the plurality of nodes to establish a connection based on the connection data and the performance metrics, cause a transmission of a connection opening indication to the first node of the plurality of nodes, and cause an establishment of a connection between the joining node and the first node of the plurality of nodes.

In an example embodiment of the apparatus, the mesh network is a Bluetooth low energy network. In some example embodiments of the apparatus, the connection data comprises a connection interval or a connection oriented channel credit value. In a further example embodiment of the apparatus, the apparatus is configured to determine a node from the plurality of nodes with which to establish a connection by determining the node of the plurality of nodes with the highest connection characteristics or performance metrics that also meets a predetermined connection data threshold.

In still another example embodiment a computer program product is provided including at least one non-transitory computer-readable storage medium having computer-executable program portions stored therein, with the computer-executable program code portions comprising program code instructions configured to cause the transmission of an advertisement message comprising connectivity characteristics for a joining node and receive a connection opening indication from a first node of a plurality of nodes in a mesh network. The connection opening indication is based on first node of the plurality of nodes satisfying the connection characteristics and the connection opening indication is further based on the respective connection characteristics or performance metrics of the plurality of nodes. The computer-executable program code portions including program code instructions are also configured to cause the establishment of a connection between the joining node and the first node of the plurality of nodes.

In an example embodiment the computer-executable program code portions, of the computer program product, further include program code instructions configured to determine connection characteristics data for the joining node. In some examples of this embodiment the computer-executable program code portions further include program code instructions configured to determine second connection characteristics for the joining node in response to establishing a connection to the first node, cause a transmission of a second advertisement message comprising the second connection characteristics data, receive a connection opening indication from a second node of the plurality of nodes with the connection opening being based on the second node of the plurality of nodes satisfying the connection characteristics, and cause the establishment of a connection between the joining node and the second node and disestablishment of the connection between the joining node and the first node.

In an example embodiment of the computer program product, the mesh network is a Bluetooth low energy network. In some example embodiments of the computer program product, the connection characteristics include a connection interval or a connection oriented channel credit value. In still further example embodiments of the computer program product, the connection opening indication is based on a delay interval based on the connection characteristics or performance metrics of the node of the plurality of nodes sending the connection opening indication.

In some example embodiments of the computer program product, the delay interval is a predetermined period of time. In an example embodiment of the computer program product, the delay interval is a predetermined number of advertisement messages received.

In an additional example embodiment, a computer program product is provided including at least one non-transitory computer-readable storage medium having computer-executable program portions stored therein, with the computer-executable program code portions including program code instructions configured to receive an advertisement message including connection characteristics for a joining node, and cause a transmission of a connection opening indication from a first node of a plurality of nodes in a mesh network. The connection opening indication is based on the first node satisfying the connection characteristics and the connection opening indication is further based on the respective connection characteristics or performance metrics of the plurality of nodes. The computer-executable program code portions including program code instructions are also configured to cause an establishment of a connection between the joining node and the first node of the plurality of nodes.

In an example embodiment of the computer program product, the computer-executable program code portions further include program code instructions configured to determine a connection opening indication delay time interval based on the connection characteristics or performance metrics of the first node of the plurality of nodes. In an example embodiment of the computer program product the mesh network is a Bluetooth low energy network. In some example embodiments of the computer program product the connection characteristics comprise a connection interval or a connection oriented channels credit value.

In yet another example embodiment a computer program product is provided including at least one non-transitory computer-readable storage medium having computer-executable program portions stored therein, with the computer-executable program code portions including program code instructions configured to cause the transmission of an advertisement message from a mesh network. The advertisement message includes node connection data or performance metrics for a plurality of nodes. The computer-executable program code portions also include program code instructions configured to receive a connection opening indication from a joining node at a first node of the plurality of nodes based on the connection data or performance metrics and cause the establishment of a connection between the joining node and first node of the plurality of nodes.

In some example embodiments of the computer program product the computer-executable program code portions further include program code instructions configured to aggregate connection or performance metrics for the plurality of nodes. In an example embodiment of the computer program product the mesh network is a Bluetooth low energy network. In some embodiments of the computer program product, the connection opening indication is based on determining a node of the plurality of nodes with the highest connection characteristics or performance metrics and that also meets a predetermined connection data threshold. In still further embodiments of the computer program product, the connection data comprises a connection interval or a connection oriented channel credit value.

In a further example embodiment a computer program product is provided including at least one non-transitory computer-readable storage medium having computer-executable program portions stored therein, with the computer-executable program code portions including program code instructions configured to receive an advertisement message from a mesh network at a joining node. The mesh network comprises a plurality of nodes. The advertisement message includes connection data or performance metrics associated with the respective nodes of the plurality of nodes. The computer-executable program code portions including program code instructions are also configured to determine a first node from the plurality of nodes to establish a connection based on the connection data and the performance metrics, cause a transmission of a connection opening indication to the first node of the plurality of nodes, and cause an establishment of a connection between the joining node and the first node of the plurality of nodes.

In an example embodiment of the computer program product, the mesh network is a Bluetooth low energy network. In some example embodiments of the computer program product, the connection data comprises a connection interval or a connection oriented channel credit value. In further example embodiments of the computer program product, the computer program code instructions are configured to determine a node from the plurality of nodes to establish a connection by determining the node of the plurality of nodes with the highest connection characteristics or performance metrics and that also meets a predetermined connection data threshold.

In a further example embodiment, an apparatus is provided including means for receiving an advertisement message from a mesh network at a joining node. The mesh network includes a plurality of nodes, and the advertisement message comprises connection data or performance metrics data associated with the respective nodes of the plurality of nodes. The apparatus also includes means for determining a first node from the plurality of nodes to establish a connection based on the connection data and the performance metrics means for causing a transmission of a connection opening indication to the first node of the plurality of nodes, and means for causing an establishment of a connection between the joining node and the first node of the plurality of nodes.

In an example embodiment an apparatus is provided including means for receiving an advertisement message including connection characteristics for a joining node and means for causing a transmission of a connection opening indication from a first node of a plurality of nodes in a mesh network. The connection opening indication is based on the first node satisfying the connection characteristics, and the connection opening indication is further based on the respective connection characteristics or performance metrics of the plurality of nodes. The apparatus also includes means for causing an establishment of a connection between the joining node and the first node of the plurality of nodes.

In yet another example embodiment, an apparatus is provided that includes means for causing the transmission of an advertisement message from a mesh network. The advertisement message includes node connection data or performance metrics for a plurality of nodes. The apparatus also includes means for receiving a connection opening indication from a joining node at a first node of the plurality of nodes based on the connection data or performance metrics and means for causing the establishment of a connection between the joining node and first node of the plurality of nodes.

In still a further example embodiment, an apparatus is provided including means for causing the transmission of an advertisement message comprising connectivity characteristics for a joining node and means for receiving a connection opening indication from a first node of a plurality of nodes in a mesh network. The connection opening is based on the first node of the plurality of nodes satisfying the connection characteristics and the connection opening is further based on the respective connection characteristics or performance metrics of the plurality of nodes. The apparatus also includes means for causing the establishment of a connection between the joining node and the first node of the plurality of nodes.

BRIEF DESCRIPTION OF THE DRAWINGS

Figure 1:
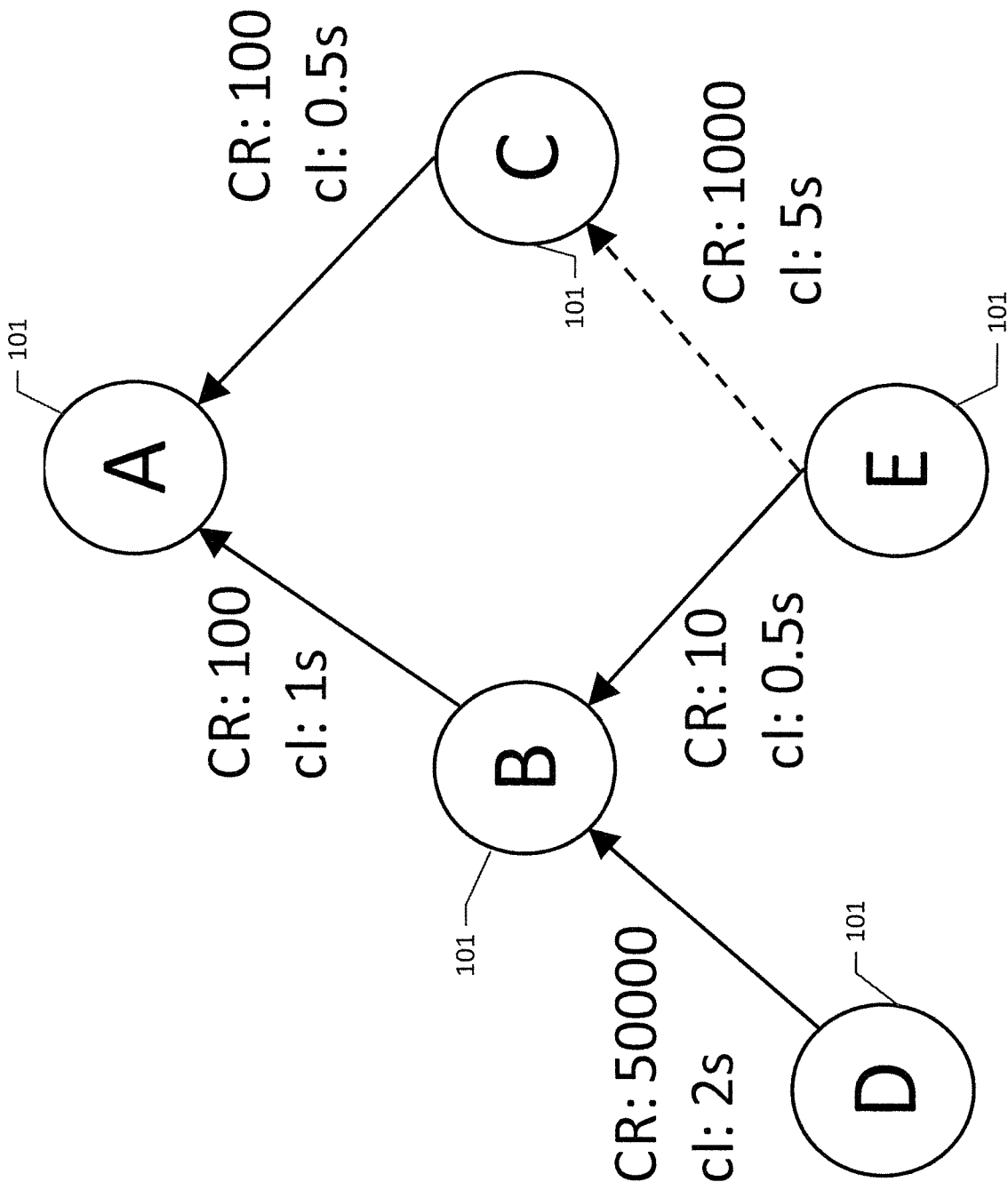
Figure 3:
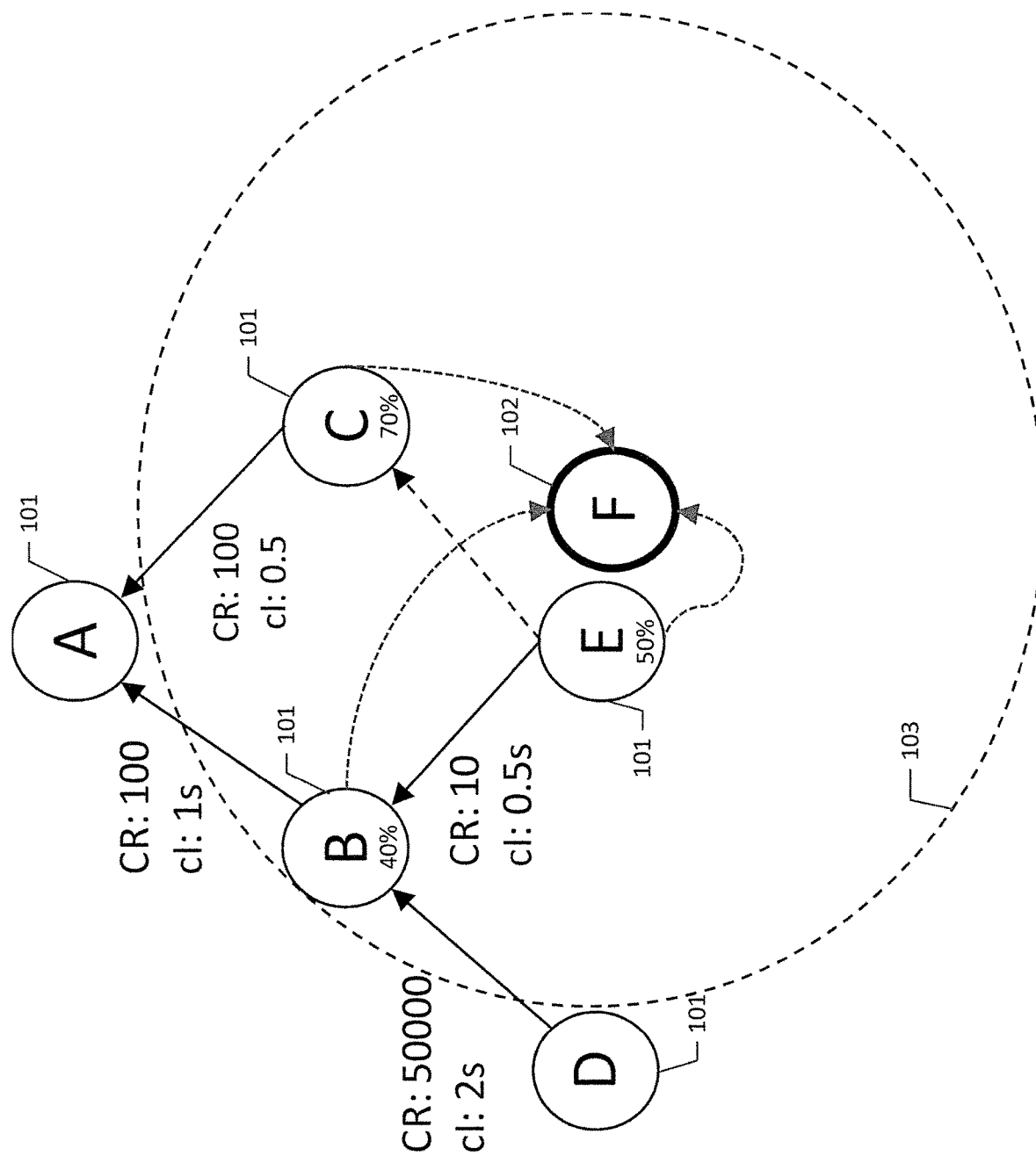
Figure 4:
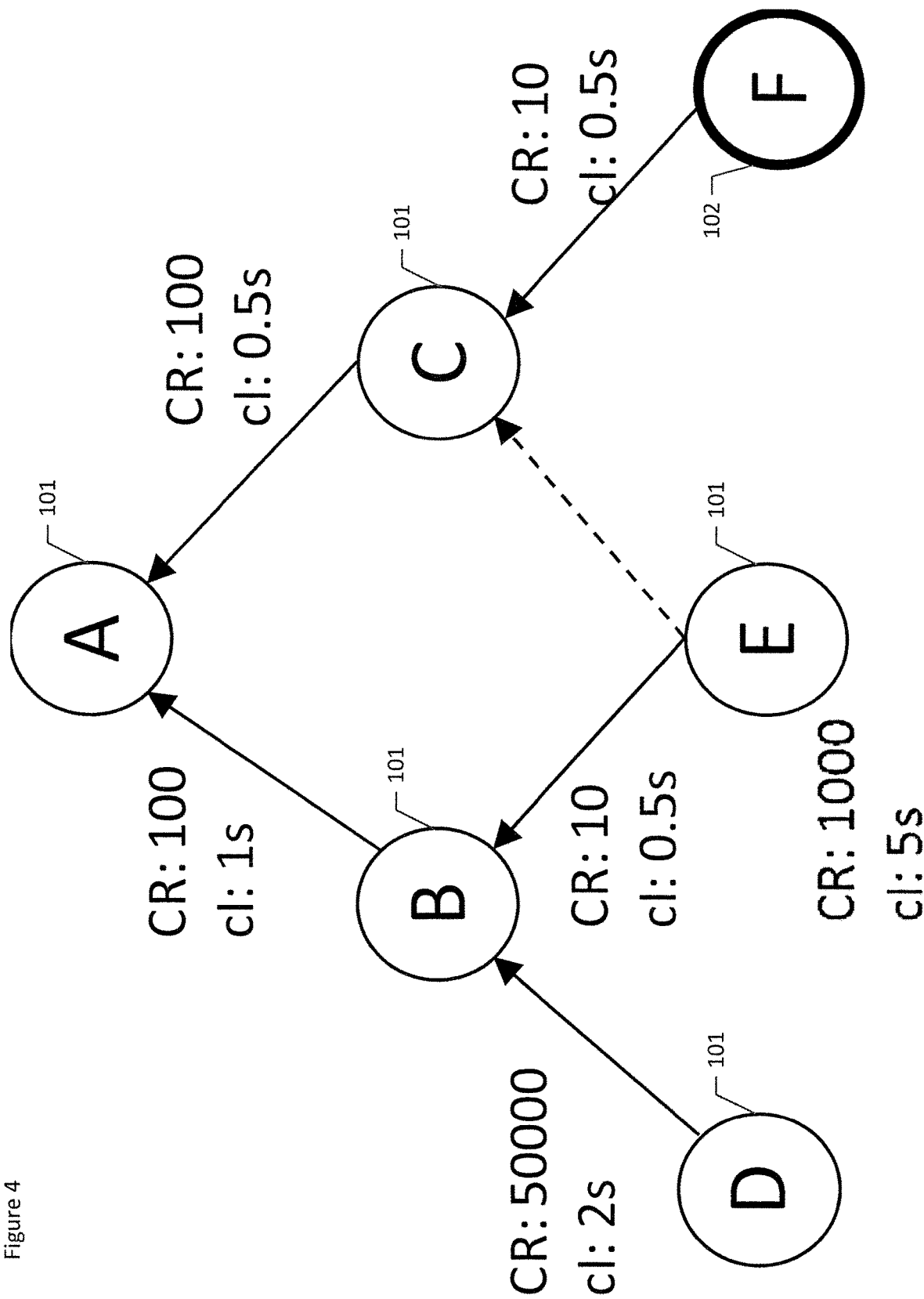
Figure 5:
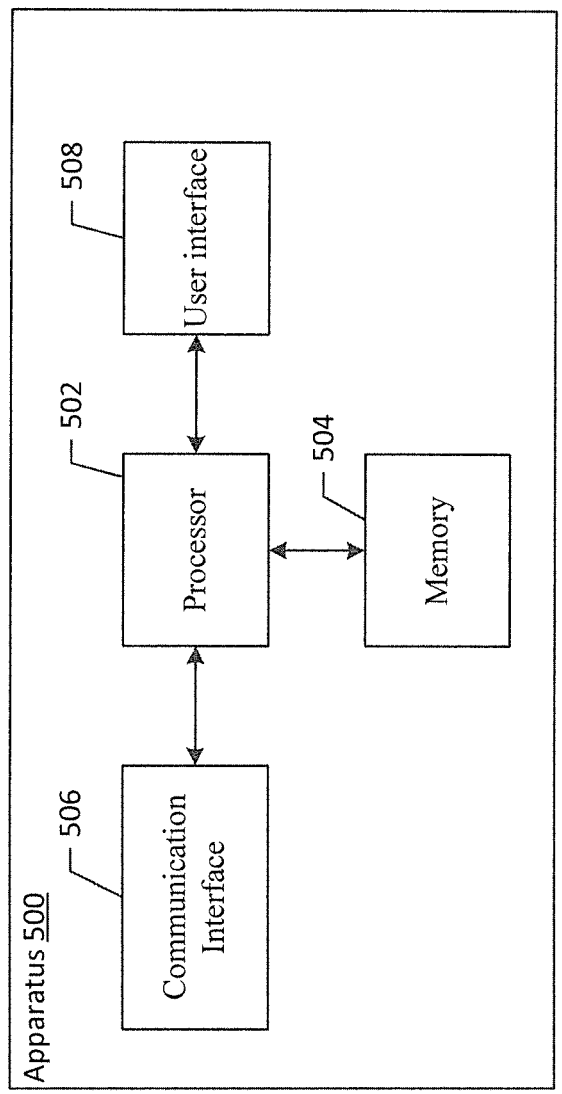

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is an example directed acyclic graph information options message structure in accordance with an example embodiment of the present invention;

FIGS. 3 and 4 illustrate a communications diagram in accordance with an embodiment of the present invention;

FIG. 5 is a block diagram of an apparatus that may be specifically configured for connecting to an optimal node of a Bluetooth low energy mesh network in accordance with an example embodiment of the present invention; and FIGS. 6A, 6B, 7A, and 7B are a flowcharts illustrating the operations performed, such as by the apparatus of FIG. 5, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus and computer program product are provided in accordance with an example embodiment for connecting to a node, such as an optimal node, of a mesh network, e.g. a Bluetooth low energy mesh network. FIG. 1 illustrates a communication diagram including user equipment nodes 101 in a mesh network, such as a Bluetooth low energy mesh network. The nodes may be may be a mobile phone, tablet computer, laptop computer, personal data assistant (PDA), digital television, desktop computer, router, sensor, actuator, or other computing, communication devices and/or Internet of Things node. In the depicted mesh network or directed acyclic graph (DAG), node A 101 is the root node, e.g. the node which has direct internet access. Nodes B and C 101 are child nodes of node A. Node B is the parent node for node D and the preferred parent for node E, which has two parent candidates, nodes B and C. Node C is the alternate, non-preferred parent candidate of node E. Nodes A, B, and C 101 are forwarding nodes, and nodes D and E are leaf nodes. Forwarding nodes pass data from nodes farther away from the root to nodes closer to and including the root node. Leaf nodes do not forward data to other nodes.

Nodes 101 may establish an aggregate path metric for determining connection data including the connection event interval (connInterval) and minimum connection oriented channel (COC) credit from the root node A to the leaf nodes D and E. The aggregate connInterval and COC credit information may be used to enable nodes to select parent nodes having the smallest connInterval aggregate value, e.g. the aggregate connInterval from the parent to through any forwarding nodes to the root node is smallest and has sufficient COC credits. The node paths with the smallest aggregate connInterval may be the smallest latency paths from the root node A and go through more powerful nodes. More powerful nodes may have shorter connIntervals than less power nodes which may need to sleep for longer periods of time.

Additionally, or alternatively the aggregate connInterval and COC credit information may be used by nodes to select the longest aggregate connInterval delay to seek the path with the smallest energy consumption.

The aggregate metric may be collected as DAG Information Options (DIO) messages that travel from the root node A to the leaf nodes D and E. In an instance in which RPL is used, the aggregated connInterval and COC credit data may be placed in a new Routing Metric/Constraint Object, such as a routing metric defined in RFC 6551 and depicted in FIG. 2. The new object would be allocated unique value for Routing-MC-Type field, the fields "Res Flags, P, C, O, R, and Prec" would be used as defined in standard. The A flag would be set to zero. The object body would contain the 32-bit aggregated connInterval value. The routing metric/constraint object data may be transmitted as a portion of a DAG metric container. An example routing metric/constraint object body may contain a 32 bit field aggregated value coninterval, in which A would indicate the aggregate value. For COC credit information the routing metric and/or constraint object body may contain two values, such as two 16 bit values, containing the minimum number of credits toward and from a destination, in which A would represent the minimum value. It is noted that the two example routing metric/constraint object message formats described are for illustrative purposes only and other message formats would be immediately appreciated by one of ordinary skill in the art.

The COC credit information is a repeatedly varying value as it may be decreased for each transaction and increased as a peer gives credits when acknowledging a packet. Additionally or alternatively, a peer may give credits unrelated to packet transactions. The values for COC credit in the DOI may indicate an average expected value to preclude flooding the network with DOI message updates.

RPL may be used to construct one or more destination-oriented directed acyclic graphs (DODAG) for various optimization priorities. For example, one DODAG may be generated for prioritized minimum COC credits, and another for prioritizing a maximum or minimum aggregated connInterval. In an example embodiment, the advertisement message may contain multiple DIO messages for each DAG advertising node participating, and/or the prioritization of the DODAGs.

Referring again to FIG. 1, Nodes A-E 101 each indicate the Bluetooth low energy link specific credit amount (CR) from parents to children, for example, node A towards B-CR: 100, node B towards E-CR: 10, node A towards C-CR: 1000, node B towards D-CR: 50000, and node C toward E-CR: 1000. Nodes A-E also have the connInterval (cI) values for each links, e.g. link A-B: cI 1 s, link B-E: 0.5 s, link A-C: 0.5 s, link B-D: 2 s, and link C-E: 5 s, where s is seconds delay in connInterval. FIG. 1 illustrates COC credits set from the parent nodes toward child nodes, however in Bluetooth low energy the credit value is set separately for both directions of each link, e.g. parent toward child and child toward parent.

Additionally or alternatively, the nodes A-E 101 may determine their respective performance metrics, such as power data, distance to mesh root, or device configuration, which may be used by nodes to determine how well the respective node can be used as a forwarding node in a mesh network. In an example determination of node power data respective nodes may determine if the node is externally powered (e.g. connected to a power outlet, hard wired, or the like), battery powered, or an energy harvesting device, and the respective node current energy/power capacity. The power data may be shared and transmitted in a manner substantially similar to the aggregated connInterval and/or the COC credit data.

Distance to mesh root may be the number of node hops required to transmit informations from a joining node 102 through one or more mesh nodes, such as nodes B-E, to the root node A. For Example referring to FIG. 3, if the joining node 102 established a connection of node C 101, there is a hop count of 2, F to C and C to A. If the joining node 102 established a connection to node E 101, there is a hop count of 3, F to E, E to B, and B to A. Device configuration may be automatic or manual settings of the device which may allow or prefer, not prefer, or not allow the node device to be used as a routing node. In some embodiments the node device may change the configuration settings based on other factors, such as the device power data, device connection to a network, such as signal strength, or the like.

Transmission of the Advertisement Message from a Node in the Mesh Network

In an example embodiment, a node 101 of the mesh network may broadcast an advertisement message, using wireless communication such as Bluetooth low energy. The advertisement message may indicate that the node 101 is a portion of the mesh network and the routing metric/constraint object data including connection data, e.g. aggregated connInterval, COC credit, and/or power level data for respective nodes of the mesh network and other network related information, such as network identification, signal strength bandwidth, or the like. In an example embodiment the advertisement message may include one or more DIO messages.

In an instance in which a node, such as node 102 of FIGS. 3 and 4 is configured to join a mesh network, the node may scan for advertisement messages. The joining node 102 may use the advertisement message data, e.g. connection data, such as connIntervals, COC credit, and/or power data to determine a node from the plurality of nodes in the mesh network with which to connect. The joining node may be configured to prefer connections having the highest power level which also satisfy the joining node's connection characteristics. In an instance in which the nodes 101 with the highest power data do not have satisfactory connectivity, the joining node 102 may determine a node with a lower power data, but a satisfactory connInterval and/or COC credit, would be a suitable connection point. The joining node 102 may transmit a connection opening indication and establish a connection with the node determined to be a suitable connection point in the mesh network.

FIG. 3 illustrates a joining node F 102 moving to a position in which the receiving range 103 of the joining node includes nodes B, C, and E 101. In this example, the nodes 101 are assumed to have no or equal power data. The joining node 102 receives the advertisement message containing the DIO message from nodes B, C, and E, but not from A or C, which are outside of the receiving range 103 of joining node 102. The advertisement message may indicate CR: 100 and cl: 1 s for node B, CR: 100 and cl: 0.5, for node C and minimum CR on any leg on path from A to B to E: 10 (min(100(B),10(E))) and aggregated cl of path from A to B to E: 1.5 (1(A–B)+0.5(B–E)). The advertisement message may additionally or alternatively indicate potential connection characteristics for a new link, e.g. connection, between a node 101 and the joining node F 102. In yet another embodiment, the advertisement message may indicate the connection characteristics which the joining node F 102 in relation to the root node A 101. In this example node C has the shortest connInterval and a satisfactory COC credit, where 100 is an acceptable COC credit for node F. Joining node F 102 may determine that node C is the most suitable connection point of the mesh network. The joining node F 102 may transmit a connection opening indication and establish a connection with node C 101 of the mesh network, as illustrated in FIG. 4. The DIO message may be updated for the connInterval and COC credit data for node F 102. In the example depicted in FIG. 4 node C has towards F CR: 10 and cl: 0.5 when connected to node C.

Transmission of the Advertisement Message from the Joining Node

In an example embodiment, the joining node F 102 may determine the connection characteristics desired in a mesh network node for a suitable connection. The joining node 102 may transmit an advertisement message including connection characteristics for a suitable connection including, for example, connInterval, COC credits, or the like. Nodes 101 of the mesh network may scan for advertisement messages and compare the connection characteristics, such as, the connInterval and/or COC credit, of the respective node to the connection characteristics. In an instance in which only one node 101 satisfies the connection characteristics, the node 101 with the suitable connection may transmit a connection opening indication and establish a connection between the joining node and the suitable node.

In an instance in which more than one node 101 is a suitable node by satisfying the connection characteristics, the nodes may attempt to establish the connection with the joining node 102 based on their respective connection characteristics and/or performance metrics. In this regard the node with the best connection characteristics, performance metrics, or combination of both from among the nodes that satisfy the connection characteristics may initially attempt to establish a connection with the joining node. The joining node 102 may establish a connection in response to the first received attempt to establish a connection by a suitable node and reject any subsequent attempts to connect to the joining node by other suitable nodes.

In an example embodiment, the nodes 101 may be associated with a delay interval based on their respective connection characteristics and/or performance metrics, such as a time delay or a delay measured by the number of advertisement messages received. A time delay interval may be 10, 50, or 75 seconds, or any other time interval. The delay interval based on a predetermined number of advertisement messages received may be a delay that extends until the receipt of a first advertisement message, receipt of a second advertisement message, receipt of a third advertisement message, or any other number of the advertisement message from the same joining node 102 before the joining node terminates the advertisement message transmissions.

The nodes 101 may have a connection characteristic metric associated with the delay interval. Nodes 101 that exceed the connection characteristics by a predetermined percentage, e.g. 50 percent, 1 s cl, or 200 CR, may have a zero delay interval, nodes that exceed the connection characteristics by a second predetermined threshold, 25 percent, 0.5 cl, or 100 CR, may have a first delay interval, and nodes that exceed the connection characteristics by a third predetermined threshold, e.g. 10 percent, 0.2 s cl, or 50 CR.

Alternatively, the node delays may have an inverse relationship, such as inversely proportional relationship to the amount in which the node exceeds the connection characteristics. This may ensure that the node 101 with the best connection characteristics available, or the suitable nodes, would start to serve as the parent of the joining node 102.

The nodes 101 may have a power data priority associated with the delay interval. For example, nodes with a high priority power data, such as supplied by a power outlet, or battery with full capacity, may attempt to send a connection opening indication and establish a connection with the joining node 102 immediately or in response the first advertisement message, thereby having a delay interval of zero. Once the connection is established the joining node 102 may terminate the transmission of advertisement messages. Nodes 101 with lower but reasonable power data, e.g. nodes reliant on a battery with sufficient power to establish an additional connection, may transmit a connection opening indication and attempt to establish a connection after a short delay which may be based on the respective power data, for example nodes with 90% battery power may wait 10 seconds or until the second advertisement message is received, and nodes with 50% power may wait 50 seconds or until a third advertisement message is received. As an example, the delay may have an inverse relationship, such as inversely proportional relationship, to the percentage of battery power that is available for consumption. This may ensure that the node with the most energy or highest power data, of the suitable nodes, would start to serve as the parent for the joining node.

The nodes 102 may have priority associated with distance to mesh root, where a delay interval is longer for each additional hop count. For example, if the joining node would have a hop count of 1, joining node to root node there may be no delay. In an instance in which the hop count is 2, joining node to parent node to root node, the node 101 may have a first delay interval, and a longer delay interval for each additional hop count.

In an instance in which the node 101 device configuration is allowed or preferred, the node may have a zero delay interval. In an instance in which the device configuration is not preferred the node may have a predetermined delay interval such as the longest delay interval which would not prevent a connection with the joining node. In an example embodiment the delay interval may be an increase of the delay interval based on connection characteristics, power data, distance to mesh root, or the like.

In an instance in which the joining node 102 does not establish a connection or receive a connection opening indication within a predetermined period, the joining node may terminate the advertisement request and alter the connection characteristics, such as increasing the suitable connInterval or decreasing the suitable COC credit value. In some embodiments the predetermined period may be a predetermined number of advertisement transmissions, such as 4 transmissions. In some example embodiments, the predetermined period may be a predetermined time for establishing a connection based on the advertisement message, such as 100 seconds.

Returning to FIG. 3, node F 102 receiving range includes nodes B, C, and E 101. Node F 102 may transmit an advertisement message including connection characteristics which include CR: 10 and cl: 10 s. In this example the respective node DIO messages would indicate CR: 10 (min(100,10)) and cl: 1.5 s (1.0 s+0.5 s) for node B, based on path from A to B, and the characteristics B would give for new link B to F, assumed being the same B gives for E. The CR: 100 (min(1000,100)) and cl: 5.5 s (0.5 s+5 s), for node C assuming C would give F same characteristics as for E, and CR: 10 (min(100,10,10—that E would give for F)) and cl: 2.0 s (1 s+0.5 s+0.5 s—that E would give for F) for node E. The connection characteristics for node E may be the minimum of the CR and aggregated cl data from nodes B and nodes E, as the data information must travel through both node E and node B to get to the root node A. Therefore nodes B, C, and E would all be suitable connection nodes since each satisfy the connection conditions. In an instance in which there is a node 101 with the highest power data, e.g. receiving power form a power outlet, hard wired, a battery at 100% charge, or the like, which is not the case here, that node would immediately transmit a connection opening indication and attempt to establish a connection with node F 102, effectively having a zero delay interval.

Nodes B, C, and E may determine a delay interval based on respective power levels. This example is directed toward a delay interval based on power data but one of ordinary skill in the art would appreciate that similar delay interval determinations may be made for connection characteristics or other performance characteristics. For a time based delay interval Node C with a power level of 70% may determine a delay interval of 30 seconds, Node E with a 50% power level may determine a 50 seconds delay interval, and node B with a 40% power level may determine a 60 second delay interval.

In an instance in which the delay interval is based on receiving a predetermined number of advertisement messages, node C may determine a delay interval of the second received advertisement message, Node E may determine a delay interval of the third received advertisement message, and node B may determine a delay interval of the fourth received advertisement message, based on the respective node power data.

Node C 101 may wait the determined delay interval before transmitting a connection opening and establish a connection with the joining node F, as depicted in FIG. 4. Once the connection is established between node C and node F, the joining node F may terminate transmission of the advertisement message. In an instance in which the delay interval is based on receiving a predetermined number of advertisement messages, nodes B and E may not receive further advertisement messages from node F and may not attempt to transmit a connection opening indication to establish a connection, having not satisfied the predetermined delay interval. In an instance in which the delay interval is a time period, nodes B and E 101 may attempt to establish a connection with joining node F 102, which may be unsuccessful due to the connection with node C.

In an example embodiment, the joining node F 102 may determine second connection characteristics based on establishing a connection to a node 101 of the mesh network. The joining node may desire a better connection that the established connection, due to degradation of the established connection or a change in the joining node connection needs, e.g. an increase in data to be transferred. The connection characteristics may include connIntervals, COC credits, or the like for a better connection, for example a shorter connInterval or larger COC credit value. The joining node 102 may additionally determine an advertisement message transmission interval which is different when connected to a network than when the joining node is not connected. Similarly, the joining node 102 may recommence sending advertisement messages including the first or second connection characteristics in an instance in which the network connection degrades after connection to the mesh network.

Following connection to the mesh network, the joining node 102 may transmit a second advertisement message including the second connection characteristics. The nodes 101 may determine suitable connections as discussed above and establish a connection between the joining node 102 and a second suitable node and disestablish the connection with the first suitable node.

In an instance in which the joining node 102 has established a connection with a suitable node 101, the joining node may use standard routing protocols, such as RLP, to join to the IP-level mesh network.

Example Apparatus

Nodes 101 or joining node 102 may include or otherwise be associated with an apparatus 500 as shown in FIG. 5. The apparatus, such as that shown in FIG. 5, is specifically configured in accordance with an example embodiment of the present invention to provide for connecting to a node, such as an optimal node of a mesh network, such as a Bluetooth low energy mesh network. The apparatus may include or otherwise be in communication with a processor 502, a memory device 504, a communication interface 506, and a user interface 508. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 500 may be embodied by nodes 101 or a joining node 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 502 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 502 may be configured to execute instructions stored in the memory device 504 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 500 of an example embodiment may also include a communication interface 506 that may be any means such as a device or circuitry embodied in either hardware or a combination of hardware and software that is configured to receive and/or transmit data from/to a communications device in communication with the apparatus, such as to facilitate communications with one or more nodes 101, or joining nodes 102, or the like. In this regard, the communication interface may include, for example, an antenna (or multiple antennas) and supporting hardware and/or software for enabling communications with a wireless communication network, such as Bluetooth low energy, Wi-Fi, Near field communications, $3^{rd}$ Generation Partnership Project (3GPP) defined GPRS, EDGE, WCDMA, HSPA, LTE, LTE-Advanced, or other cellular networks, or the like. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 500 may also include a user interface 508 that may, in turn, be in communication with the processor 502 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 504, and/or the like).

Figures 6A, 6B:
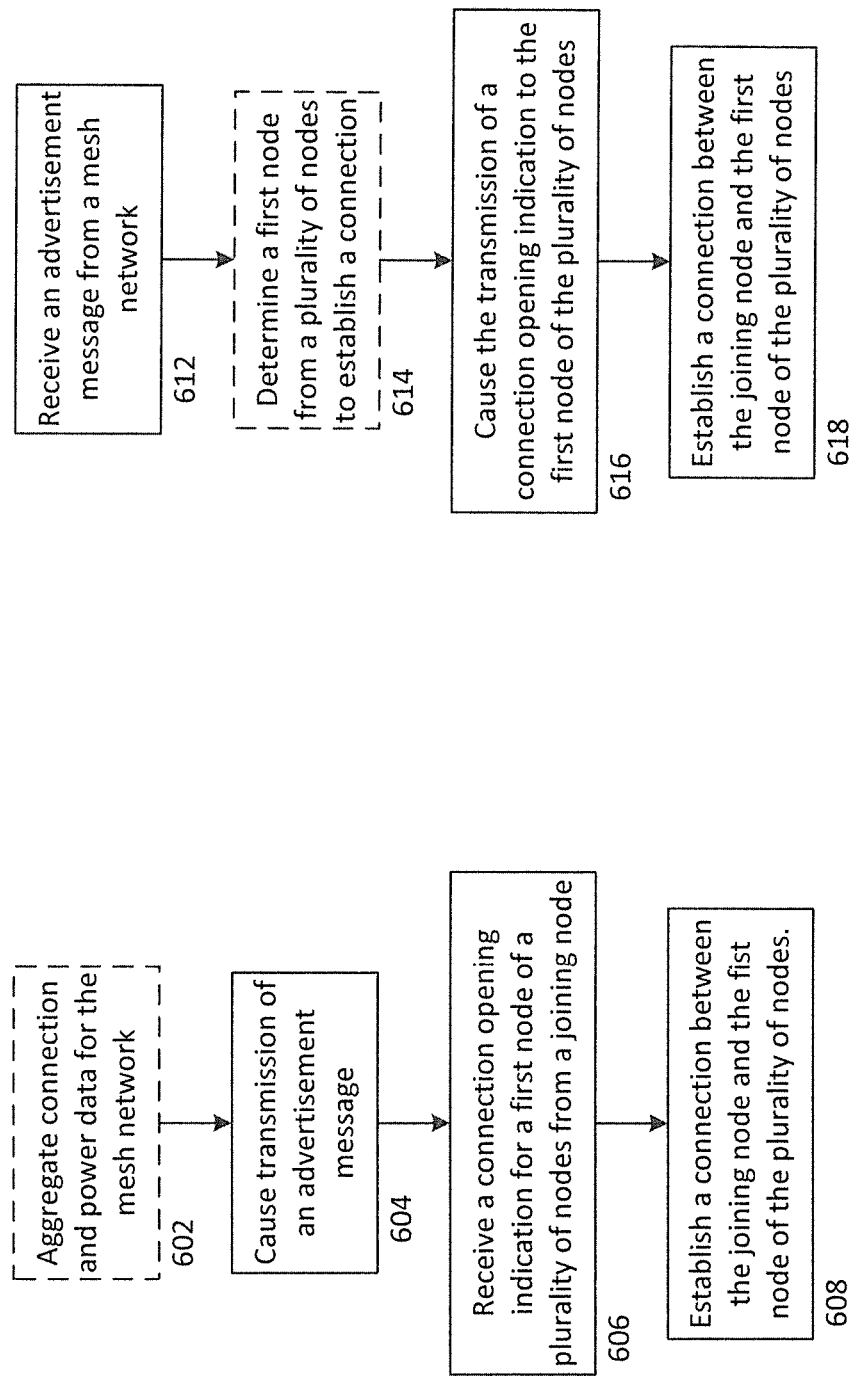

Example Processes for Connecting to a Node of a Mesh Network in Response to Transmission of an Advertisement Message Referring now to FIGS. 6A and 6B, the operations performed, such as by the apparatus 500 of FIG. 5, for connecting to a node of a mesh network in response to the transmission of an advertisement message are depicted. In an example embodiment, the apparatus may be embodied by a node 101 of the mesh network. As shown in block 602 of FIG. 6A, the apparatus 500 may include means, such as a processor 502, a memory 504, a communications interface 506, or the like, configured to aggregate connection and power data for the mesh network. The processor 502 may establish an aggregate path metric for determining connection data including the connection event interval (connInterval) and minimum connection oriented channel (COC) credit form the root node, e.g. node A to the leaf nodes, e.g. nodes D and E. The aggregate connInterval and COC credit information may be used to enable nodes to select parent nodes having the smallest connInterval aggregate value, e.g. the aggregate connInterval from the parent through any forwarding nodes to the root node that is the smallest and has sufficient COC credits. The node paths with the smallest aggregate connInterval may have the smallest latency path from the root node and go through more powerful nodes. More powerful nodes may have shorter connIntervals than less powerful nodes which may need to sleep for longer periods of time.

Additionally, or alternatively the aggregate connInterval and COC credit information may be used by nodes to select the longest aggregate connInterval delay to seek the path with the smallest energy consumption.

The aggregate metric may be collected, via the communications interface 506, as DAG Information Options (DIO) messages travel from the root node to the leaf nodes. In an instance in which RPL is used, the aggregated connInterval and COC credit data may be placed in a routing metric/constraint object data, as depicted in FIG. 2. The routing metric/constraint object data may be transmitted as a portion of a DAG metric container. An example routing metric/constraint object body may contain a 32 bit field aggregated value coninterval, in which a flag field A would indicate the value is an aggregate value. For COC credit information the routing metric and/constraint object body may contain two 16 bit values containing the minimum number of credits toward and from a destination, in which A would indicate the value is minimum. It is noted that the two example routing metric/constraint object message formats described are for illustrative purposes only and other message formats would be immediately appreciated by one of ordinary skill in the art. DIO messages may be stored in a memory 504 for later transmission by the communication interface 506 or use by the processor 502.

The COC credit information is a constantly varying value as it may be decreased for each transaction and increased as a peer gives credits when acknowledging a packet. Additionally or alternatively, a peer may give credits unrelated to packet transactions. The values for COC credit in the DOI may indicate an average expected value to preclude flooding the network with DOI message updates.

RPL may be used to construct one or more destination-oriented directed acyclic graphs (DODAG) for various optimization priorities. For example, one DODAG may be generated for prioritized minimum COC credits, and another for prioritizing a maximum or minimum aggregated connInterval. In an example embodiment, the advertisement message may contain multiple DIO messages for each DAG advertising node participating, and/or the prioritization of the DODAGs.

Referring again to FIG. 1, Nodes A-E 101 each indicate the Bluetooth low energy link specific credit amount (CR) from parents to children, for example, node A towards B-CR: 100, node B towards E-CR: 10, node A towards C-CR: 1000, node B towards D-CR: 50000, and node C toward E-CR: 1000. Nodes A-E also have the connInterval (cI) values for each links, e.g. link A-B: cI 1 s, link B-E: 0.5 s, link A-C: 0.5 s, link B-D: 2 s, and link C-E: 5 s, where s is seconds delay in connInterval. FIG. 1 illustrates COC credits set from the parent nodes toward child nodes, however in Bluetooth low energy the credit value is set separately for both directions of each link, e.g. parent toward child and child toward parent.

Additionally or alternatively, the processor 502 may determine the respective performance metrics, such as power data, distance to mesh root, or device configuration of nodes A-E 101, which may be used by nodes to determine how well the respective node can be used as a forwarding node in a mesh network. In an example determination of node power data respective nodes may determine if the node is externally powered (e.g. connected to a power outlet, or hard wired), battery powered, or is an energy harvesting device, and the respective node current energy/power capacity. The power data may be shared, transmitted, and/or stored in memory in a manner substantially similar to the aggregated connInterval and/or the COC credit data, e.g. connection data.

Distance to mesh root may be the number of node hops required to transmit informations from a joining node 102 through one or more mesh nodes, such as nodes B-E, to the root node A. For Example referring to FIG. 3, if the joining node 102 established a connection of node C 101, there is a hop count of 2, F to C and C to A. If the joining node 102 established a connection to node E 101, there is a hop count of 3, F to E, E to B, and B to A.

Device configuration may be automatic or manual settings of the device which may allow or prefer, not prefer, or not allow the node device to be used as a routing node. In some embodiments the node device may change the configuration settings based on other factors, such as the device power data, device connection to a network, such as signal strength, or the like.

As shown in block 604 of FIG. 6A, the apparatus 500 may include means, such as a processor 502, a memory 504, a communications module 506, or the like, configured to cause the transmission of an advertisement message. The processor 502 may cause the communication interface 506 to transmit the advertisement message using wireless communications, such as Bluetooth low energy. The advertisement message may indicate that the node 101 is a portion of the mesh network and the routing metric/constraint object data may include connection data, e.g. aggregated connInterval, COC credit, and/or power data for respective nodes of the mesh network and other network related information, such as network identification, signal strength bandwidth, or the like. In an example embodiment the advertisement message may include the DIO message.

As shown at block 606, of FIG. 6A, the apparatus 500 may include means, such as a processor 502, a communications interface 506, or the like, configured to receive a connection opening indication from a joining node. The communication interface 506 may receive a connection opening indication from a joining node addressed to a specific node 101 of the mesh network. In an instance in which a node, such as node 102 of FIGS. 3 and 4 is configured to join a mesh network, the node may scan for advertisement messages. The joining node 102 may use the advertisement message data, e.g. connection data such as, connIntervals, COC credit and/or power data, to determine a node 101 from the plurality of nodes in the mesh network with which to connect. The joining node 102 may be configured to prefer connections having the highest power level which satisfies the joining node's connection characteristics, e.g. maximum conn interval and/or minimum COC credit. In an instance in which the nodes 101 with the highest power data do not have satisfactory connection characteristics, the joining node 102 may determine a node with a lower power data, but a satisfactory connInterval and COC credit to be a suitable connection point. The joining node 102 may transmit a connection opening indication with the node 101 determined to be the most suitable connection point in the mesh network.

As shown at block 608 of FIG. 6A, the apparatus 500 may include means, such as a processor 502, a communications interface 506, or the like, configured to establish a connection with the suitable node 101 of the mesh network using wireless communications, such as Bluetooth low energy messaging. In an instance in which the joining node 102 has established a connection with a suitable node 101, the processor 502 may use standard routing protocols, such as RLP, to join to the IP-level mesh network.

Referring now to FIG. 6B, as shown at block 612 of FIG. 6B, the apparatus 500 embodied by or otherwise associated with the joining node 102 may include means, such as a processor 502, communications interface 506, or the like, configured to receive an advertisement message. The processor 504 may be configured to scan for advertisement messages in an instance in which a node, such as node 102 of FIGS. 3 and 4, is configured to join a mesh network. The processor 502 may receive the advertisement message from the communications interface 506, which in turn receives the advertisement message from a node 101 of a mesh network as described at block 604.

As shown at block 614 of FIG. 6B, the apparatus 500 may include means, such as a processor 502, or the like, configured to determine a first node from a plurality of nodes to establish a connection. The processor 502 may use the advertisement message data, e.g. connection data such as, connIntervals, COC credit and/or power data to determine a first suitable node from the plurality of nodes in the mesh network with which to connect. The processor 502 may be configured to prefer connections having the highest power data which satisfies the joining nodes' connection characteristics. In an instance in which the nodes 101 with the highest power data do not have satisfactory connection characteristics, the processor 502 may determine a node with a lower power data, but a satisfactory conn Interval and COC credit, to be a suitable connection point.

The example in FIG. 3 illustrates a joining node F 102 moving to a position in which the receiving range 103 of the joining node includes nodes B, C, and E 101. In this example, the nodes 101 are assumed to have no or equal power data. The joining node 102 receives the advertisement message containing the DIO message from nodes B, C, and E 101, but not from nodes A or C, which are outside of the receiving range 103 of joining node. The advertisement message may indicate CR: 100 and cI: 1 s for node B, CR: 100 and cI: 0.5, for node C, and minimum CR on any leg on path from A to B to E: 10 (min(100(B),10(E))) and aggregated cI of path from A to B to E: 1.5 (1(A–B)+0.5(B–E)). The advertisement message may additionally or alternatively indicate potential connection characteristics for a new link, e.g. connection, between a node 101 and the joining node F 102. In yet another embodiment, the advertisement message may indicate the connection characteristics which the joining node F 102 in relation to the root node A 101. In this example, node C has the shortest connInterval and a satisfactory COC credit, where 100 is an acceptable COC credit for node F. Joining node F 102 may determine that node C is the suitable connection point of the mesh network.

As shown at block 616 of FIG. 6B, the apparatus 500 may include means, such as a processor 502, a communications interface 506, or the like, configured to cause the transmission of a connection opening indication to the determined first node of the plurality of nodes in the mesh network. The processor 502 may cause the communications interface 506 to transmit a connection opening indication which specifies a first suitable node of the plurality of nodes in the mesh network. Continuing the example, the joining node F 102 may transmit a connection opening indication to node C 101 of the mesh network.

As shown at block 618 of FIG. 6B, the apparatus 500 may include means, such as a processor 502, communications interface 506, or the like, configured to cause the establishment a connection between the joining node and the first node of the plurality of nodes. The processor may cause the communications interface to establish a wireless connection, such as a Bluetooth low energy connection with the determined suitable node, as discussed at 608. The DIO message may be updated for the connInterval and COC credit data for node F 102. In the example depicted in FIG. 4, node F has a CR: 10 and cI: 0.5 when connected to node C.

Example Processes for Connecting to a Node of a Mesh Network in which a Joining Node Transmits an Advertisement Message Referring now to FIGS. 7A and 7B, the operations performed, such as by the apparatus 500 of FIG. 5 embodied by or otherwise associated with the joining node 102, for connecting to a node of a mesh network in which a joining node transmits an advertisement message. As shown in block 702 of FIG. 7A, the apparatus 500 may include means, such as a processor 502, a memory 504, or the like, configured to determine connection characteristics for a joining node. Connection characteristics for a suitable connection to a mesh network may include a predetermined threshold value for connInterval, COC credits, or the like. The processor 502 may store the connection characteristics in a memory 504 for later processing, updating or transmission.

As shown in block 704 of FIG. 7A, the apparatus 500 may include means, such as a processor 502, a communications interface 506, or the like, configured to cause the transmission of an advertisement message. The processor 502 may cause the communication interface to transmit the advertisement message at a predetermined interval, such as once each 20 seconds. The advertisement message may include the connection characteristics, As shown in block 706 of FIG. 7A, the apparatus 500 may include means, such as a processor 502, communications interface 506, or the like, configured to receive a connection opening indication from a first node or a plurality of nodes in a mesh network. The processor 506 may receive a connection opening indication from the communication interface, which in turn receives the connection opening indication from a node in the plurality of nodes using wireless communications, such as Bluetooth low energy communication. The first node may be a node 101 which satisfies the connection characteristic predetermined threshold value.

In an instance in which the joining node does not receive a connection opening indication within a predetermined period the processor may terminate the advertisement request and alter the connection characteristics, such as increasing the suitable connInterval or decreasing the suitable COC credit value. In some embodiments the joining node 102 predetermined period may be a predetermined number of advertisement transmissions, such as 4 transmissions. In some example embodiments, the joining node 102 predetermined period may be a predetermined time for establishing a connection based on the advertisement message, such as 100 seconds.

As shown in block 708 of FIG. 7A, the apparatus 500 may include means, such as a processor 502, a communications interface 506, or the like, configured to establish communications between the joining node 102 and the first node 101 of the plurality of nodes. The processor 502 may cause the communications interface 506 to establish a communications with the first node 101 using wireless communication, such as Bluetooth low energy communication. In an instance in which the processor 502 has established communication with the first node of the plurality of nodes, the processor may use standard routing protocols, such as RLP, to join to the IP-level mesh network.

As shown in block 710 of FIG. 7A, the apparatus 500 may include means, such as a processor 502, or the like configured to determine second connection characteristics. The processor 502 may determine second connection characteristics contingent upon and employed following connection to a node 101 of the mesh network. The connection characteristics may include connIntervals, COC credits, or the like for a better connection, for example a shorter connInterval or larger COC credit value. The determination of second connection characteristics may be response to any connection or in response to a degraded connection.

As shown in block 712 of FIG. 7A, following the connection to the mesh network the apparatus 500 may include means, such as a processor 502, communications interface 506, or the like configured to cause the transmission of a second advertisement message. The processor 502 may transmit a second advertisement message including the second connection characteristics. The processor 502 may additionally determine an advertisement message transmission interval which is different when connected to a mesh network than when the node is not connected.

As shown in block 714 of FIG. 7A, the apparatus 500 may include means, such as a processor 502, communications interface 506, or the like, configured to receive a connection opening indication from a second node of a plurality of nodes in a mesh network. The processor 506 may receive a connection opening indication from the communication interface, which in turn receive the connection opening indication from a second node 101 in the plurality of nodes using wireless communications, such as Bluetooth low energy communications. The second node may be a node 101 which satisfies the connection characteristic predetermined threshold value.

As shown in block 716 of FIG. 7A, the apparatus 500 may include means, such as a processor 502, a communications interface 506, or the like, configured to establish communications between the joining node 102 and the second node 101 of the plurality of nodes. The processor 502 may cause the communications interface 506 to establish communications as described at 708.

Referring to FIG. 7B, as shown in block 750, the apparatus 500 embodied by or otherwise associated with a node 101 of the mesh network may include means, such as a processor 502, a communications interface 506, or the like, configured to receive an advertisement message from a joining node 102. The processor 502 may receive an advertisement message from the communications interface 506, which in turn receives the advertisement message from the joining node 102. The advertisement message may include connection characteristics for a suitable connection between the joining node and a mesh network which may include a predetermined threshold value for connInterval, COC credits, or the like.

As shown in block 752 of FIG. 7B, the apparatus 500 may include means, such as a processor 502, or the like configured to determine a connection opening delay interval. The processor 502 may determine if the node 101 satisfies the connection characteristic and determine the connection opening indication delay interval.

In an instance in which more than one node 101 is a suitable node by satisfying the connection characteristics, the nodes may attempt to establish the connection with the joining node 102 based on their respective connection characteristics and/or performance metrics. In this regard the node with the best connection characteristics, performance characteristics, or combination of both from among the nodes that satisfy the connection characteristics may initially attempt to establish a connection with the joining node. The joining node 102 may establish a connection in response to the first received attempt to establish a connection by a suitable node and reject any subsequent attempts to connect to the joining node by other suitable nodes.

The delay interval may be based on the respective connection characteristics and/or performance metrics of the nodes 101, such as a time delay or delay measured by the number of advertisement messages received. A time delay interval may be 10, 50, or 75 seconds or any other time interval. The delay interval based on a predetermined number of advertisement messages received may be a delay that extends until the receipt of a first advertisement message, receipt of a second advertisement message, receipt of a third advertisement message, or any other number of the advertisement message from the same joining node 102 before the joining node terminates the advertisement message transmissions.

The nodes 101 may have a connection characteristic metric associated with the delay interval. Nodes 101 that exceed the connection characteristics by a predetermined percentage, e.g. 50 percent, 1 s cl, or 200 CR, may have a zero delay interval, nodes that exceed the connection characteristics by a second predetermined threshold, 25 percent, 0.5 cl, or 100 CR, may have a first delay interval, and nodes that exceed the connection characteristics by a third predetermined threshold, e.g. 10 percent, 0.2 s cl, or 50 CR. Alternatively, the node delays may have an inverse relationship, such as inversely proportional relationship to the amount in which the node exceeds the connection characteristics. This may ensure that the node 101 with the best connection characteristics available, or the suitable nodes, would start to serve as the parent of the joining node 102.

The nodes 101 may have a power data priority associated with the delay interval. For example, nodes with a high priority power data, such as supplied by a power outlet, hard wired, or battery with full capacity, may have a zero delay interval. Nodes 101 with lower but reasonable, e.g. sufficient power capacity to support an additional connection, power levels may have a short delay interval which may be based on the respective power data, for example nodes with 90% battery power may wait 10 seconds or until the second advertisement message is received, and nodes with 50% power may wait 50 seconds or until a third advertisement message is received. This may ensure that the node with the most energy or highest power level, of the suitable nodes, would start to serve as the parent for the joining node.

The nodes 102 may have priorities associated with distance to mesh root, where a delay interval is longer for each additional hop count. For example, if the joining node would have a hop count of 1, joining node to root node there may be no delay. In an instance in which the hop count is 2, joining node to parent node to root node, the node 101 may have a first delay interval, and a longer delay interval for each additional hop count.

In an instance in which the node 101 device configuration is allowed or preferred, the node may have a zero delay interval. In an instance in which the device configuration is not preferred the node may have a predetermined delay interval such as the longest delay interval which would not prevent a connection with the joining node. In an example embodiment the delay interval may be an increase of the delay interval based on connection characteristics, power data, distance to mesh root, or the like.

Returning to FIG. 3, node F receiving range includes nodes B, C, and E. Node F may transmit an advertisement message including connection characteristics which include CR: 10 and cl: 10 s. In this example the respective node DIO messages would indicate CR: 10 (min(100,10)) and cl: 1.5 s (1.0 s+0.5 s) for node B, based on path from A to B, and the characteristics B would give for new link B to F, assumed being the same B gives for E. The CR: 100 (min(1000,100)) and cl: 5.5 s (0.5 s+5 s), for node C assuming C would give F same characteristics as for E, and CR: 10 (min(100,10,10—that E would give for F)) and cl: 2.0 s (1 s+0.5 s+0.5 s—that E would give for F) for node E. Therefore nodes B, C, and E would all be suitable connection nodes. In an instance in which there is a node with a highest power level, e.g. receiving power from a power outlet, hard wired, a battery at 100% charge, or the like, which is not the case here, the node would a zero delay interval. Nodes B, C, and E may determine a delay interval based on respective power levels. For a time based delay interval Node C with a power level of 70% may determine a delay interval of 30 seconds, Node E with a 50% power level may determine a 50 seconds delay interval, and node B with a 40% power level may determine a 60 second delay interval. This example is directed toward a delay interval based on power data but one of ordinary skill in the art would appreciate that similar delay interval determinations may be made for connection characteristics or other performance characteristics.

As shown in block 754 of FIG. 7B, the apparatus 500 may include means, such as a processor 502, a communications interface 506, or the like, configured to cause the transmission of a connection opening indication from a first node of the plurality of nodes. The processor 502 may cause the communications interface 506 to transmit the connection opening indication to the joining node 102 after the expiration of the delay interval discussed at 752.

As shown in block 756 of FIG. 7B, the apparatus 500 may include means, such as a processor 502, a communications interface 506, or the like, configured to cause the establishment of a connection between the joining node 102 and the first node 101 of the plurality of nodes. The processor 502 may cause the communications interface to establish a connection with the joining node 102 using wireless communication, such as Bluetooth low energy communication. In an instance in which the processor 502 has establish the connection with the joining node, the processor may use standard routing protocols, such as RLP, to join to the IP-level mesh network.

Using the processes described herein, the joining node 102 of an example embodiment may learn the optimal point for connecting to the network prior to establishing an IP over Bluetooth low energy, or other connection, to any node. This reduces the timing and power consumption required by the comparative process of connecting to a multitude of nodes, learning, using RPL over IP which node is the optimal connection, e.g. parent node of the DAG, and then disconnecting unnecessary connections to nodes that are not chosen.

As described above, FIGS. 6A, 6B, 7A, and 7B illustrate flowcharts of an apparatus 500, method, and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 504 of an apparatus employing an embodiment of the present invention and executed by a processor 502 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 602, 614, 702, 710-716, and 752 in FIGS. 6A, 6B, 7A, and 7B. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    causing transmission, from one of a plurality of nodes in a mesh network to a joining node, of an advertisement message comprising first connection characteristics data for the joining node and performance metrics of the plurality of nodes of said mesh network, wherein the first connection characteristics data comprise a connection oriented channel credit value and the performance metrics comprise power data and one or more of a distance to a mesh root or device configuration information;
    receiving, at one of the plurality of nodes of said mesh network, from the joining node, a first connection opening indication, wherein the first connection opening indication is based on a first node of the plurality of nodes satisfying the first connection characteristics data, wherein the first connection opening indication is further based on the first connection characteristics data and performance metrics of the plurality of nodes;
    causing establishment of a connection between the joining node and the first node;
    determining second connection characteristics for the joining node in response to establishing the connection between the joining node and the first node;
    causing transmission, from one of the plurality of nodes, to the joining node, of a second advertisement message comprising second connection characteristics data; and
    in an instance in which one of the plurality of nodes receives a second connection opening indication from the joining node, the second connection opening indication being based on a second node of the plurality of nodes satisfying the second connection characteristics, causing establishment of a connection between the joining node and the second node and disestablishment of the connection between the joining node and the first node.

2. The method claim 1 further comprising:
    determining said first connection characteristics data and said second connection characteristics data for the joining node.

3. The method of claim 1, wherein the mesh network is a Bluetooth low energy network.

4. The method of claim 1, wherein the first connection opening indication is based on a delay interval dependent upon the first connection characteristics data or the performance metrics of the first node of the plurality of nodes.

5. The method of claim 4, wherein the delay interval is a predetermined period of time.

6. The method of claim 4, wherein the delay interval is measured in terms of a predetermined number of advertisement messages received.

7. A method comprising:
    receiving, by a joining node, from one of a plurality of nodes in a mesh network, of a first advertisement message comprising first connection characteristics data for the joining node and performance metrics of the plurality of nodes of said mesh network, wherein the first connection characteristics data comprise a connection oriented channel credit value and the performance metrics comprise power data and one or more of a distance to a mesh root or device configuration information;
    causing transmission, from the joining node, to one of the plurality of nodes, of a first connection opening indication, wherein the first connection opening indication is based on a first node of the plurality of nodes satisfying the first connection characteristics data, wherein the first connection opening indication is further based on the first connection characteristics data and the performance metrics of the plurality of nodes;
    causing establishment of a connection between the joining node and the first node;
    determining second connection characteristics for the joining node in response to the connection being established between the joining node and the first node;
    receiving, at the joining node, from one of the plurality of nodes, of a second advertisement message comprising second connection characteristics data; and
    in an instance in which one of the plurality of nodes receives a second connection opening indication from the joining node, the second connection opening indication being based on a second node of the plurality of nodes satisfying the second connection characteristics, causing establishment of a connection between the joining node and the second node and disestablishment of the connection between the joining node and the first node.

8. The method of claim 7 further comprising:
    determining a connection opening indication delay time interval based on the first node of the plurality of nodes power data.

9. An apparatus comprising:
at least one processor; and
at least one memory including computer program code, the at least one memory and the computer program code configured, with the at least one processor, to cause the apparatus to at least:
cause transmission, from one of a plurality of nodes in a mesh network to a joining node, of an advertisement message comprising first connection characteristics data for the joining node and performance metrics of the plurality of nodes of said mesh network, wherein the first connection characteristics data comprise a connection oriented channel credit value and the performance metrics comprise power data and one or more of a distance to a mesh root or device configuration information;
receive, at one of the plurality of nodes of said mesh network, from the joining node, of a first connection opening indication, wherein the first connection opening indication is based on a first node of the plurality of nodes satisfying the first connection characteristics data, wherein the first connection opening indication is further based on at least the power data of the plurality of nodes;
cause establishment of a connection between the joining node and the first node;
determine second connection characteristics for the joining node in response to establishing the connection between the joining node and the first node;
cause transmission, from one of the plurality of nodes, to the joining node, of a second advertisement message comprising second connection characteristics data; and
in an instance in which one of the plurality of nodes receives a second connection opening indication from the joining node, the second connection opening indication being based on a second node of the plurality of nodes satisfying the second connection characteristics, cause establishment of a connection between the joining node and the second node and disestablishment of the connection between the joining node and the first node.

10. The apparatus of claim 1, wherein the at least one memory and the computer program code are further configured to:
determine the first connection characteristics data and the second connection characteristics data for the joining node.

11. The apparatus of claim 1, wherein the first connection opening indication is based on a delay interval, the delay interval being dependent upon the first connection characteristics data or the performance metrics of the first node of the plurality of nodes.

12. The apparatus of claim 11, wherein the delay interval is a predetermined period of time.

13. The apparatus of claim 11, wherein the delay interval is measured in terms of a predetermined number of advertisement messages received.

14. An apparatus comprising:
at least one processor; and
at least one memory including computer program code, the at least one memory and the computer program code configured to, with the at least one processor, cause the apparatus to at least:
receive, by a joining node, from one of a plurality of nodes in a mesh network, a first advertisement message comprising first connection characteristics data for the joining node and performance metrics of the plurality of nodes of said mesh network, wherein the first connection characteristics data comprise a connection oriented channel credit value and the performance metrics comprise power data and one or more of a distance to a mesh root or device configuration information;
cause transmission from the joining node, to one of the plurality of nodes, of a first connection opening indication, wherein the first connection opening indication is based on a first node of the plurality of nodes satisfying the first connection characteristics data, wherein the first connection opening indication is further based on the first connection characteristics data and the performance metrics of the plurality of nodes;
cause establishment of a connection between the joining node and the first node of the plurality of nodes;
determine second connection characteristics for the joining node in response to establishing the connection between the joining node and the first node;
cause transmission, from one of the plurality of nodes, to the joining node, of a second advertisement message comprising second connection characteristics data; and
in an instance in which one of the plurality of nodes receives a second connection opening indication from the joining node, the second connection opening indication being based on a second node of the plurality of nodes satisfying the second connection characteristics, cause establishment of a connection between the joining node and the second node and disestablishment of the connection between the joining node and the first node.

15. The apparatus of claim 14, wherein the at least one memory and the computer program code are further configured to:
determine a connection opening indication delay time interval based on power data associated with the first node of the plurality of nodes.

16. The method of claim 7, further comprising:
aggregating the first connection characteristics including the connection oriented channel credit value from a root node to a leaf node of the mesh network.

17. The apparatus of claim 14, wherein the at least one memory and the computer program code are further configured to:
aggregate the first connection characteristics including the connection oriented channel credit value from a root node to a leaf node of the mesh network.

* * * * *

UNITED STATES PATENT AND TRADEMARK OFFICE
CERTIFICATE OF CORRECTION

| | |
|---|---|
| PATENT NO. | : 11,089,533 B2 |
| APPLICATION NO. | : 15/305274 |
| DATED | : August 10, 2021 |
| INVENTOR(S) | : Savolainen |

It is certified that error appears in the above-identified patent and that said Letters Patent is hereby corrected as shown below:

In the Claims

Column 27,
Lines 44 and 50, "claim 1" should read --claim 9--.

Signed and Sealed this
Twentieth Day of September, 2022

Katherine Kelly Vidal
*Director of the United States Patent and Trademark Office*